US011993077B2

(12) United States Patent
Yoshii

(10) Patent No.: US 11,993,077 B2
(45) Date of Patent: May 28, 2024

(54) PRINTING DEVICE, PRINTING CONTROL METHOD, AND STORAGE MEDIUM

(71) Applicant: CASIO COMPUTER CO., LTD., Tokyo (JP)

(72) Inventor: Masakazu Yoshii, Ome (JP)

(73) Assignee: CASIO COMPUTER CO., LTD., Tokyo (JP)

(*) Notice: Subject to any disclaimer, the term of this patent is extended or adjusted under 35 U.S.C. 154(b) by 163 days.

(21) Appl. No.: 17/592,079

(22) Filed: Feb. 3, 2022

(65) Prior Publication Data

US 2022/0242109 A1 Aug. 4, 2022

(30) Foreign Application Priority Data

Feb. 4, 2021 (JP) ................................ 2021-016737
Aug. 31, 2021 (JP) ................................ 2021-140927

(51) Int. Cl.
*B41J 2/045* (2006.01)
*B41J 2/21* (2006.01)

(52) U.S. Cl.
CPC ....... *B41J 2/04505* (2013.01); *B41J 2/04586* (2013.01); *B41J 2/2103* (2013.01)

(58) Field of Classification Search
CPC .. B41J 2/04505; B41J 2/04586; B41J 2/2103; B41J 2/2135; B41J 29/02; B41J 29/393; B41J 3/407; B41J 3/4073; B41J 2/1433; B41J 2002/14475; B41J 2/162; A45D 2029/005; A45D 29/00
See application file for complete search history.

(56) References Cited

U.S. PATENT DOCUMENTS

2007/0165482 A1* 7/2007 Asauchi .................. G11C 8/04 365/239
2015/0375548 A1* 12/2015 Yamasaki ............... B41J 3/407 347/5

FOREIGN PATENT DOCUMENTS

JP H11-005319 A 1/1999
JP H11309883 A 11/1999
JP 2014028463 A 2/2014
JP 2016-180857 A 10/2016
(Continued)

OTHER PUBLICATIONS

CNIPA; Application No. 202210019120.0; Office Action dated Feb. 22, 2023.

(Continued)

*Primary Examiner* — Kristal Feggins
(74) *Attorney, Agent, or Firm* — Fitch, Even, Tabin & Flannery LLP

(57) ABSTRACT

Disclosed is a printing device including: a first nozzle that ejects a first ink; a second nozzle that ejects a second ink; a third nozzle that ejects a third ink; and at least one processor that, upon performing alignment adjustment of one nozzle preparing one of the first nozzle and any of the second nozzle and the third nozzle for alignment pattern printing and the other of the first nozzle and any of the second nozzle and the third nozzle for auxiliary printing, controls to eject any of the first to third inks selected based on ejection information from among the second ink in the second cartridge and the third ink in the third cartridge, from any of the first to third nozzles for the alignment pattern printing or the auxiliary printing. The first ink, the second ink and the third ink have different colors from each other.

13 Claims, 7 Drawing Sheets

(56) References Cited

FOREIGN PATENT DOCUMENTS

| | | | |
|---|---|---|---|
| JP | 2017-18589 | A | 1/2017 |
| JP | 2017154396 | A | 9/2017 |
| JP | 2020127087 | A | 8/2020 |
| JP | 2020-161199 | A | 10/2020 |

OTHER PUBLICATIONS

JPO; Application No. 2023-035191; Notice of Reasons for Refusal dated Dec. 19, 2023.

* cited by examiner

PRINTING DEVICE, PRINTING CONTROL METHOD, AND STORAGE MEDIUM

CROSS-REFERENCE TO RELATED APPLICATIONS

This application is based upon and claims the benefit of priority from the prior Japanese Patent Applications No. 2021-016737, filed on Feb. 4, 2021, and No. 2021-140927, filed on Aug. 31, 2021, the entire contents of which are incorporated herein by reference.

BACKGROUND

Technical Field

The present disclosure relates to a printing device, a printing control method, and a storage medium.

Description of Related Art

Conventionally, printing devices (nail printing devices) have been known to print nail designs on fingernails and the like.

Using such a printing device enables to enjoy nail printing in a simple way.

When nail printing is realized with a printing device, it is necessary to print accurately at a predetermined position on the nail. The print head, which performs the printing, is mounted on the carriage of the device body, but the carriage and the print head have mounting play due to tolerances at the manufacturing stage, etc., which may cause mounting misalignment or wobble when the print head is mounted or replaced.

If printing is performed with the print head misaligned, there is a possibility that the design printed on the nail will be misaligned, or that the design will be printed protruding onto the skin other than the nail.

For this reason, for example, JP 2017-18589 A discloses that a correction pattern (position adjustment mark in JP 2017-18589 A) is printed on the printing target surface (nail surface in JP 2017-18589 A) in a color tone lower than that of the ink used for printing the nail design, and the printing position by the print head is adjusted (alignment adjustment) based on the image of the printing target surface on which the correction pattern is output.

SUMMARY

According to an aspect of the present disclosure, there is provided a printing device including: a first nozzle that ejects a first ink stored in a first cartridge; a second nozzle that ejects a second ink stored in a second cartridge; a third nozzle that ejects a third ink stored in a third cartridge; and at least one processor that: upon performing alignment adjustment of one nozzle preparing one of the first nozzle and any of the second nozzle and the third nozzle for alignment pattern printing and the other of the first nozzle and any of the second nozzle and the third nozzle as the nozzle for auxiliary printing, controls to eject any of the first ink, the second ink and the third ink, selected based on ejection information from among the second ink in the second cartridge and the third ink in the third cartridge, from any of the first nozzle, the second nozzle and the third nozzle for the alignment pattern printing or for the auxiliary printing, wherein the first ink, the second ink and the third ink have different colors from each other.

BRIEF DESCRIPTION OF DRAWINGS

The accompanying drawings are not intended as a definition of the limits of the disclosure but illustrate embodiments of the disclosure, and together with the general description given above and the detailed description of the embodiments given below, serve to explain the principles of the disclosure, wherein.

DETAILED DESCRIPTION OF EMBODIMENTS

An embodiment of a printing device, a printing control method and a storage medium according to the present disclosure will be described with reference to FIGS. 1 to 7A to 7C.

The embodiment described below is provided with various limitations technically preferable for carrying out the present disclosure. However, the scope of the present disclosure is not limited to the embodiment below or illustrated examples.

The printing device in the embodiment performs printing on printing target surfaces. Specifically, for example, fingernails (including thumbnails) of hands are the printing targets and the printing device performs nail printing on the nail surfaces as printing target surfaces. The printing device also prints alignment patterns on the surface (printing target surface) of a predetermined sheet (adjustment sheet P, described below) as the printing target for printing the alignment patterns for alignment adjustment (correction) described below when performing the alignment adjustment of the print head.

The printing device in the present disclosure may perform printing on printing targets other than the targets described in the embodiment. For example, toenails of feet may be the printing targets. The printing targets may also be nail-like objects other than human nails, such as nail tips and the surfaces of various accessories, as well as various sheets and seals.

Figure 1:
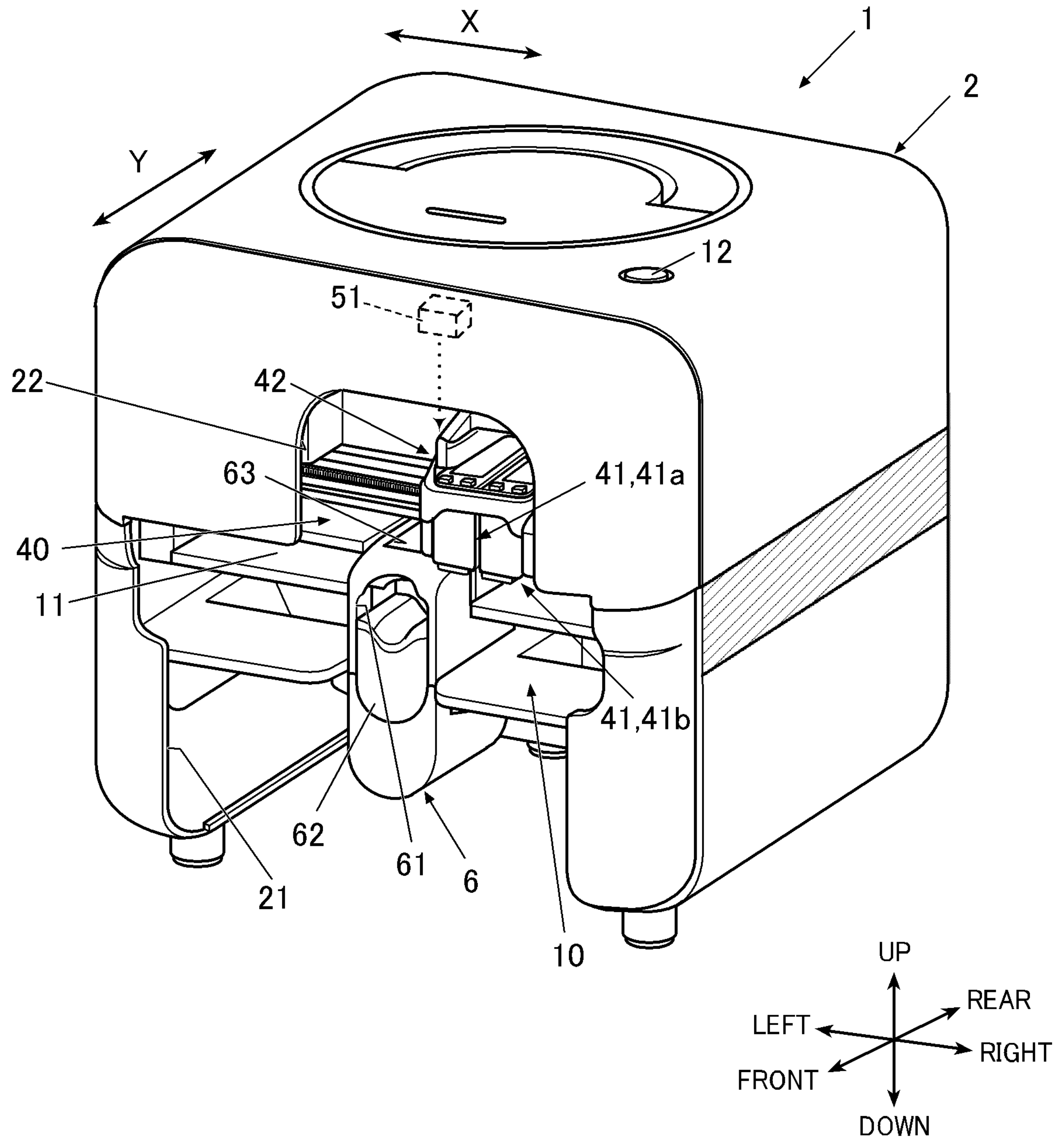
FIG. 1 is a perspective view showing a main part outer configuration of a printing device in an embodiment.

FIG. 1 is a perspective view showing the main part outer configuration of a printing device 1 in the embodiment.

In the following embodiment, the up, down, left, right, front and rear refer to the directions shown in FIG. 1. Furthermore, the X direction and the Y direction respectively refer to the left-right direction and the front-rear direction.

As shown in FIG. 1, the printing device 1 includes a housing 2 which is formed in a nearly box shape.

The housing 2 includes an opening 21 which is formed over the nearly entire surface in the left-right direction (horizontal direction of printing device 1, left-right direction in FIG. 1, X direction) in the lower section on the front surface side (front surface side of printing device 1, front side in FIG. 1). There is a cut-off portion 22 continuing to the upper side of the opening 21, in the nearly central portion in the left-right direction of the housing 2. The cut-off portion 22 functions as a port when an after-mentioned print head 41 is attached to and detached from the device.

An operation unit 12 of the printing device 1 is provided on the upper surface (top plate) of the housing 2. The operation unit 12 is an operation button (power switch button) to turn on/off the power of the printing device 1, for example. When the operation unit 12 is operated, the operation signal is output to an after-mentioned control device 30, and the control device 30 performs control in accordance with the operation signal to operate the components of the printing device 1. For example, when the operation unit 12 is a power switch button, the power of the printing device 1 is turned on/off according to the button operation.

The components of the printing device 1 may operate in accordance with the operation signal which was input from an operation unit 71 of an after-mentioned terminal device 7 instead of the operation unit 12.

The shapes, arrangement and the like of the components in the housing 2 are not limited to the illustrated example, and can be set as needed. For example, the operation unit 12 may be provided on a lateral surface, a back surface or the like, not on the upper surface of the housing 2. The housing 2 may have other various operation buttons as the operation unit 12, and may have various displays, indicators and the like.

A device body 10 is contained inside the housing 2.

The device body 10 includes a base 11, a printing unit 40 and a finger holding unit 6 attached to the base 11, for example.

The finger holding unit 6 is arranged in the nearly central portion in the left-right direction (X direction) on the device front surface side in the base 11. The finger holding unit 6 fixes (holds), in the position suitable for the printing, the finger (printing finger) having the nail which is the printing target in the present embodiment.

The finger holding unit 6 has an opening 61 on the device front surface side. A finger fixing member 62 is provided inside the finger holding unit 6. The finger fixing member 62 presses up and supports, from the lower side, the finger which is inserted from the opening 61. The finger fixing member 62 is formed of a resin or the like having flexibility, for example.

The upper surface of the finger holding unit 6 has a window 63 to expose the nail portion of the finger which was inserted from the opening 61 and is held by the finger fixing member 62.

Figure 2:
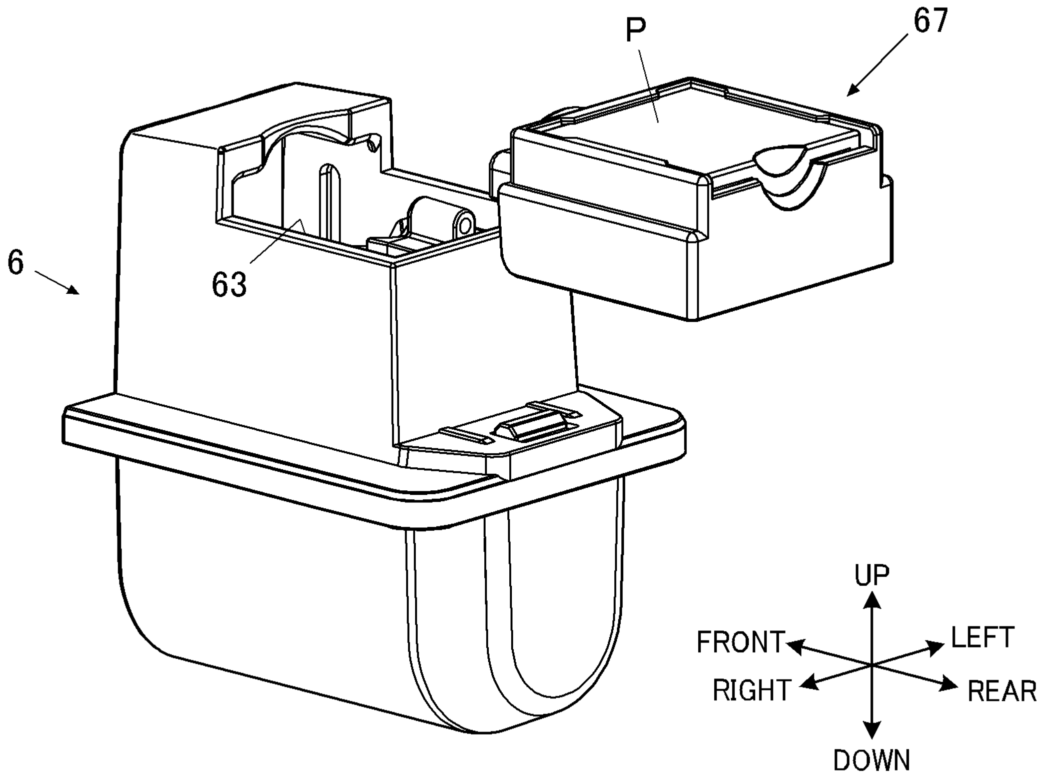
FIG. 2 is a perspective view showing the state in which a sheet placement member is about to be attached to the body of a finger holding unit.

FIG. 2 is a perspective view of the finger holding unit 6 viewed from behind at an angle.

As shown in this figure, the finger holding unit 6 is equipped with a removable sheet placement member 67 to place an adjustment sheet P in a predetermined position when the adjustment sheet P is the printing target.

The adjustment sheet P is a sheet for printing correction patterns (alignment patterns) for alignment adjustment (correction) of the print head 41, as described below. The adjustment sheet P is a sheet with a paper quality suitable for various types of printing and with a white or similar surface color. The recording sheet P may be a sheet of a color (e.g. black, etc.) in which a white or similar color ink stands out, and of a paper quality suitable for various types of printing.

The printing device 1 may be shipped with an adjustment sheet P of any color (surface color) in advance, or the user may prepare a sheet as appropriate and set the sheet on the sheet placement member 67 as the adjustment sheet P.

FIG. 2 shows the state in which the sheet placement member 67 is about to be attached to the body of the finger holding unit 6. When the sheet placement member 67 is attached to the finger holding unit 6, as shown in FIG. 2, the sheet placement member 67 is attached from the rear of the finger holding unit 6 to cover the window 63.

By attaching the sheet placement member 67 with the adjustment sheet P set to the finger holding unit 6, the surface of the adjustment sheet P (i.e., the printing target surface in the case where the adjustment sheet P is the printing target) becomes almost flush with the height position of the nail surface (i.e., the printing target surface in the case where the nail is the printing target) when the nail surface is placed in the proper position suitable for printing.

The printing unit 40 performs printing on the nail and the recording sheet P which are the printing targets.

Figure 3:
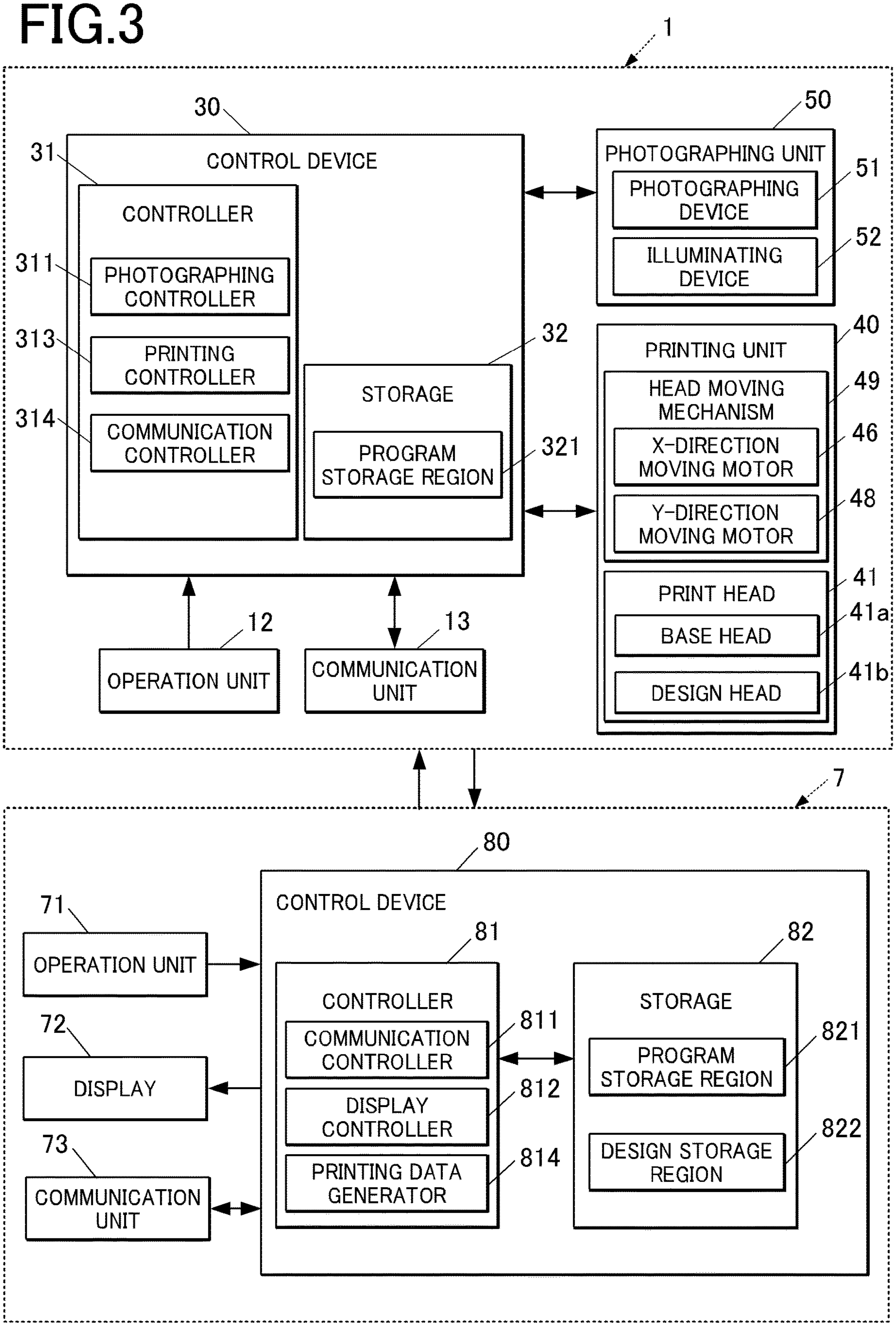
FIG. 3 is a control block diagram showing a schematic control configuration of the printing device and a terminal device in the embodiment.

As shown in FIG. 1, the printing unit 40 includes a print head 41 that is mounted on the carriage 42 to perform the printing operation, a head moving mechanism 49 for moving the print head 41 (carriage 42), and the like (see FIG. 3).

In this embodiment, the print head 41 is equipped with a base head 41*a* and a design head 41*b* that print different colors from each other on the printing target surface (the surface of the nail or the surface of the adjustment sheet P). Hereinafter, when simply referred to as "print head 41", the "print head 41" includes both of the base head 41*a* and the design head 41*b*. The arrangement and the like of the base head 41*a* and the design head 41*b* is not limited to the illustrated example.

The base head 41*a* is the head that prints other than the design. Before printing of the design, the base head 41*a* prints a liquid agent serving as a base (hereinafter referred to as a "base ink" (first ink)) on the area where the design will be printed. The base ink to be printed by the base head 41*a* is preferably a white or similar color to produce colors of inks well when the design is printed. By forming the base with the white or similar color, it becomes easier to distinguish the color of the base from the color of the skin around the nail (skin color, etc.), and it becomes easier to recognize the nail region more accurately from the nail image.

The design head 41*b* prints the design on the area where the base is printed after the base printing by the base head 41*a*. For example, the design head 41*b* is configured to be able to eject inks of colors such as cyan (C), magenta (M) and yellow (Y) (hereinafter referred to as "color inks" (second ink, third ink)). The type of color inks that can be ejected by the design head 41*b* is not limited to this, and the design head 41*b* may also be configured to be able to eject inks of other colors.

In the print head 41 of the embodiment, the surface facing the nail surface serves as the ink ejection surface including multiple nozzle openings (none of them shown in the drawings) to eject inks. The print head 41 is an inkjet type inkjet head that performs printing by making micro droplets of ink and directly spraying, from the ink ejection surface, the ink onto the nail surface which is the printing surface of the printing target (nail). Though the configuration of the print head 41 is not particularly limited, the print head 41 is a cartridge-integrated head which has the ejection mechanism section such as the ink ejection surface integrated with the ink cartridge (none of them shown in the drawings), for example.

The head moving mechanism 49 is configured by including an X-direction moving mechanism (not shown in the drawings) for moving the print head 41 in the left-right direction (X direction) of the device, and a Y-direction moving mechanism (not shown in the drawings) for moving the print head 41 in the front-rear direction (Y direction) of the device.

The X-direction moving mechanism includes an X-direction moving motor 46 (see FIG. 3), and moves the print head 41 in the left-right direction (X direction) of the device by driving the X-direction moving motor 46. The Y-direction moving mechanism includes a Y-direction moving motor 48 (see FIG. 3), and moves the print head 41 in the front-rear direction (Y direction) of the device by driving the Y-direction moving motor 48.

A photographing unit 50 is provided at a position above the window 63 of the finger holding unit 6 on the inner side of the upper surface (top plate) of the housing 2. The photographing unit 50 photographs the nail (finger including the nail) exposed from the window 63 and the surface of the adjustment sheet P set on the sheet placement member 67, and obtains an image of the nail (image of the finger including the nail, hereinafter, referred to as a "nail image") and a sheet image of the adjustment sheet P.

The photographing unit 50 includes a photographing device 51 such as a camera and an illuminating device 52 which includes a white LED to illuminate the nail that is the photographing target, for example (see FIG. 3).

The photographing device 51 is, for example, a small-sized camera configured by including a CCD (Charge Coupled Device) type or CMOS (Complementary Metal Oxide Semiconductor) type solid imaging element which has approximately two million pixels or more and a lens.

The specific arrangement and the like are not particularly limited as long as the photographing unit 50 is provided at a position capable of photographing the nail of the finger placed in the finger holding unit 6 and the surface of the adjustment sheet P. For example, the photographing unit 50 may be configured to be movable in the X and Y directions by the head moving mechanism 49 that moves the print head 41.

FIG. 3 is a control block diagram showing the schematic control configuration of the printing device 1 and an after-mentioned terminal device 7.

As shown in FIG. 3, the printing device 1 includes a communication unit 13 and a control device 30, in addition to the printing unit 40 and the photographing unit 50 described above.

The communication unit 13 is configured to be able to transmit and receive information to and from the after-mentioned terminal device 7 that operates in cooperation with the printing device 1.

The communication between the printing device 1 and the terminal device 7 is performed by, for example, a wireless LAN. The communication between the printing device 1 and the terminal device 7 is not limited to this, and any method may be used. For example, a network line such as the Internet may be used, or wireless communication based on a near field wireless communication standard such as Bluetooth (registered trademark) or Wi-Fi may be performed. Furthermore, this communication is not limited to wireless communication, and various types of data may be transmitted and received between the printing device 1 and the terminal device 7 by wired connection. The communication unit 13 includes an antenna chip or the like corresponding to the communication method of the terminal device 7.

The control device 30 is a computer that includes: a controller 31 configured by including at least one processor such as a CPU (Central Processing Unit) not shown in the drawings; and a storage 32 configured by including a ROM (Read Only Memory), a RAM (Random Access Memory), and the like as at least one memory.

The storage 32 includes a program storage region 321 to store various programs for operating the printing device 1. In the program storage region 321, there are stored various programs such as a printing program for performing printing processing, and an alignment adjustment program for executing after-mentioned alignment adjustment processing (see FIGS. 4 and 6). The controller 31 loads these programs to the working area and executes them. Thereby, the components of the printing device 1 are controlled in an integrated manner. The storage 32 may store the image obtained by the photographing unit 50 and various types of data including the data of design to be printed on the printing target.

The controller 31 includes functional sections such as a photographing controller 311, a printing controller 313, and a communication controller 314. The functions of these respective functional sections are realized by the cooperation of the CPU of the controller 31 and the program stored in the ROM of the storage 32.

In addition, the controller 31 is configured to be able to detect the attachment and detachment of the print head 41 to and from the carriage 42.

The photographing controller 311 controls the photographing device 51 and the illuminating device 52 of the photographing unit 50, and causes the photographing device 51 to photograph the finger to acquire an image of the finger (nail image) including the nail of the printing finger fixed to the finger holding unit 6 and photograph the adjustment sheet P to acquire an image of the adjustment sheet P (sheet image).

The image data of the nail image acquired by the photographing unit 50 is transmitted to the after-mentioned terminal device 7 via the communication unit 13. The image data may be stored in the storage 32.

The printing controller 313 outputs a control signal to the printing unit 40 on the basis of printing data (data for printing) transmitted from the terminal device 7, and controls the X-direction moving motor 46 and the Y-direction moving motor 48, the print head 41, and the like of the printing unit 40 so as to perform printing on the printing target according to the printing data.

The communication controller 314 controls the operation of the communication unit 13. In the present embodiment, the communication controller 314 controls communication with the terminal device 7 by the communication unit 13, to transmit and receive various types of data between the terminal device 7 and the printing device 1.

The printing device 1 in the present embodiment is configured to be able to communicate with the terminal device 7, and executes the printing operation and the like on the basis of the operation instruction from the terminal device 7.

The terminal device 7 is, for example, a mobile terminal such as a smartphone or a tablet. However, the terminal device 7 is not particularly limited as long as the terminal device 7 can communicate with the printing device 1. For example, the terminal device 7 may be a notebook or stationary personal computer, a terminal device for a game, or the like.

Specifically, the terminal device 7 includes an operation unit 71, a display 72, a communication unit 73, a control device 80, and the like.

The operation unit 71 can perform various inputs and settings according to user operations. When the operation unit 71 is operated, an input signal corresponding to the operation is transmitted to the control device 80. In the present embodiment, a touch panel is integrally provided on the surface of the display 72, and the user can perform various input/setting operations and the like by touch operations on the touch panel.

The operation unit 71 for performing various input/setting operations and the like is not limited to the touch panel. For example, various operation buttons, a keyboard, a pointing device, and the like may be provided as the operation unit 71.

In the present embodiment, various instructions such as instruction to start printing are output to the printing device 1 from the terminal device 7 by the user operating the operation unit 71.

The display 72 displays various display screens under the control of a controller 81 to be described later.

In the present embodiment, the display 72 can display a nail design which was input or selected by the user from the operation unit 71, an image which was transmitted from the printing device 1, and the like. The display 72 in the present embodiment is integrally configured with the touch panel for performing various types of inputting as mentioned above.

The communication unit 73 is configured to be able to communicate with the communication unit 13 of the printing device 1. The communication unit 73 may be any communication unit as long as the communication unit can communicate with the printing device 1, and a communication unit that meets the communication standard of the communication unit 13 of the printing device 1 is applied as the communication unit 73.

The control device 80 is a computer that includes: a controller 81 configured by including a CPU (Central Processing Unit) not shown in the drawings; and a storage 82 configured by including a ROM (Read Only Memory) and a RAM (Random Access Memory) not shown in the drawings.

The storage 82 stores various types of data and programs for operating the components of the terminal device 7.

Specifically, the storage 82 in the present embodiment includes a program storage region 821, a design storage region 822, and the like.

The program storage region 821 stores various programs such as a nail print application program for performing nail printing using the printing device 1 in addition to an operation program for controlling the components of the terminal device 7 in an integrated manner. The controller 81 expands these programs in a working area of the storage 82 and executes the programs, for example, so that the components of the terminal device 7 are integrally controlled.

The design storage region 822 stores data of nail designs (designs). The nail designs (designs) stored in the design storage region 822 may be existing designs prepared in advance, or designs created by the user. If the terminal device 7 can be connected to various networks, it may be possible to import nail designs (designs) that are stored in a server device or other device (not shown in the drawings) that can be connected to the network.

The controller 81 includes functional sections such as a communication controller 811, a display controller 812, and a printing data generator 814. The functions as these functional sections are executed by the cooperation between the controller 81 and the programs stored in the storage 82.

The communication controller 811 controls the operation of the communication unit 73.

The display controller 812 displays various display screens on the display 72.

The printing data generator 814 detects a printing region from the acquired image and generates printing data by fitting a desired design to this printing region. In more detail, the printing data generator 814 extracts the image data of the nail design (design) selected by the user, and fits this image data to the printing region by enlarging, reducing, etc.

Next, the operation of the printing device 1 when performing alignment adjustment processing will be described.

The alignment adjustment processing is processing to adjust the alignment of the print head 41 (base head 41*a* and design head 41*b*) so that there is no deviation in the printing position when the print head 41 is replaced. This alignment adjustment processing is started when the control device 30 detects the replacement of the print head 41 (i.e., attachment of a new print head 41), by the controller 31 executing the alignment adjustment processing program corresponding to the type of the detected print head 41. The alignment adjustment processing may be executed based on a user operation, for example, even when the attachment of a new print head 41 is not detected. The detection of "attachment of a new print head 41" means the detection that the print head 41 has been newly attached. There are no particular limitations on the newness or difference of the print head 41 itself before and after replacement (detachment and attachment).

In this embodiment, different alignment adjustment processing is performed on the base head 41*a* and on the design head 41*b*.

First, alignment adjustment processing of the base head 41*a* will be described.

Figure 4:
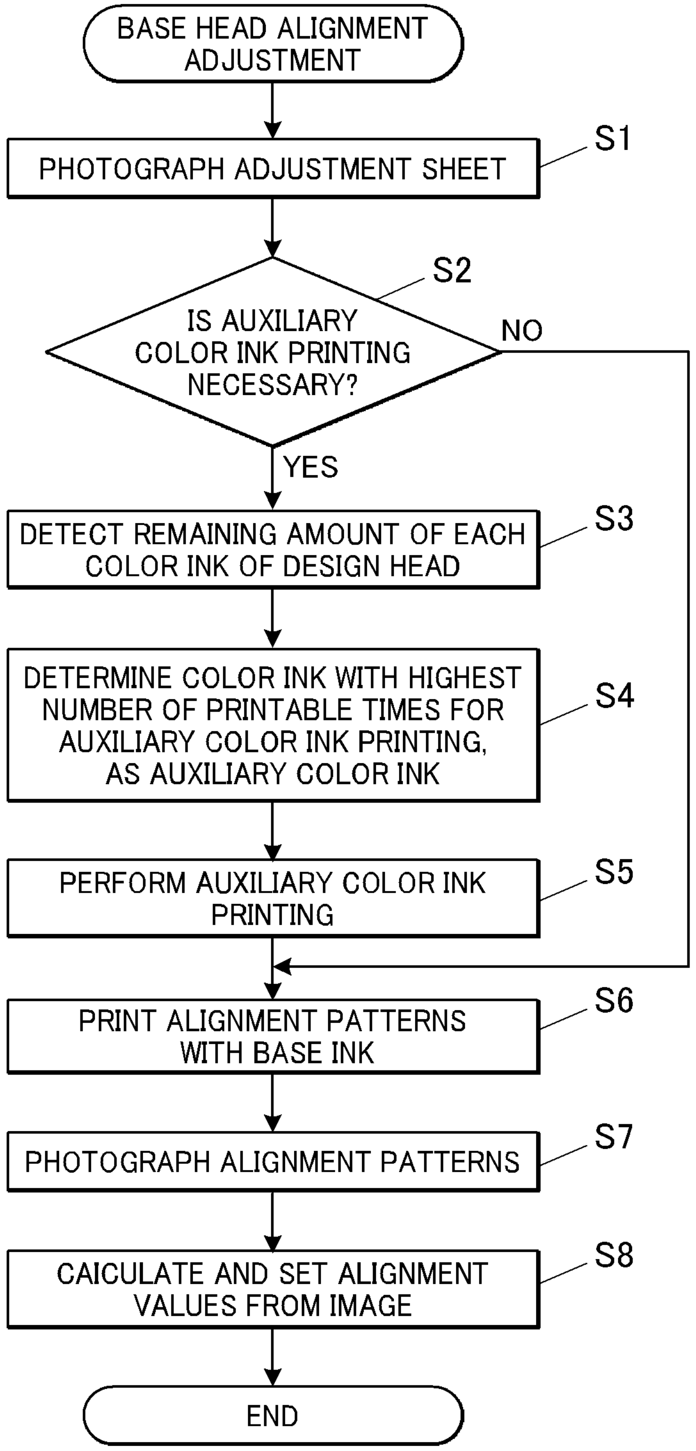
FIG. 4 is a flowchart showing the flow of alignment adjustment processing of a base head in the embodiment.
Figure 5A:
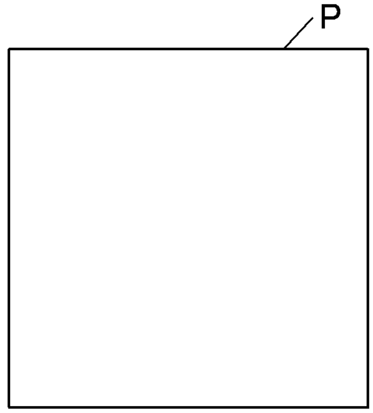
FIGS. 5A to 5C are views for explaining the alignment adjustment processing of the base head in the embodiment.
Figure 5B:
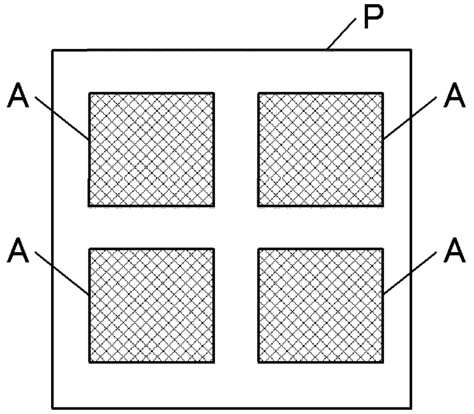
Figure 5C:
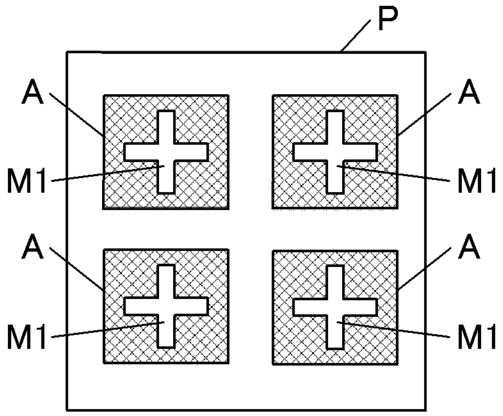

FIG. 4 is a flowchart showing the flow of the alignment adjustment processing of the base head 41*a*, and FIGS. 5A to 5C are diagrams to explain the alignment adjustment processing of the base head 41*a*.

Here, it is assumed that the alignment adjustment of the design head 41*b* has already been performed.

As shown in FIG. 4, when the alignment adjustment processing of the base head 41*a* is executed, the controller 31 first photographs the adjustment sheet P with the photographing unit 50 to acquire the sheet image (step S1).

Next, the controller 31 judges whether or not auxiliary color ink printing is necessary based on the sheet image acquired in step S1 (step S2). In the embodiment, "auxiliary color ink printing" means auxiliary printing in which the color ink of design head 41*b* is printed in the printing range so that the alignment pattern M1 (see FIG. 5C) for alignment adjustment can be recognized as an image, before printing the alignment pattern M1 with the base ink. The auxiliary color ink used for auxiliary printing is the ink that allows the alignment pattern M1 of the base ink to be identified by image processing. However, the auxiliary color ink is not limited to this as long as the ink is a different color from the base ink.

Specifically, in this step, the controller 31 first checks the state of the adjustment sheet P based on the sheet image. In the embodiment, as the state of the adjustment sheet P, it is checked whether or not the pattern printing regions A (see FIG. 5B) of the required range exist on the adjustment sheet P. The pattern printing region A is the region of the color which allows the base ink to be identified and in which the alignment pattern M1 is to be printed. The required range is the range in which multiple alignment patterns M1 of a predetermined quantity and position used for alignment adjustment can be printed. In the alignment adjustment of this embodiment, there are used a total of four pattern printing regions A and four alignment patterns M1, two of the pattern printing regions A and two of the alignment patterns M1 being arranged in each of the X and Y directions (see FIG. 5C). However, the quantity and position of the alignment pattern M1 are not limited to this.

The presence or absence and type (color) of the adjustment sheet P may also be checked as the state of the adjustment sheet P. If there is no adjustment sheet P (if the adjustment sheet P cannot be detected), the controller 31 displays a message on the display 72 of the terminal device 7 to prompt the user to set the adjustment sheet P. If there is an adjustment sheet P, the controller 31 detects and sets its type (color).

Then, when the controller 31 detects the pattern printing regions A in the required range, the controller 31 judges that the auxiliary color ink printing is not necessary. When the pattern printing regions A in the required range cannot be detected, the controller 31 judges that the auxiliary color ink printing is necessary.

If the controller 31 judges that the auxiliary color ink printing is not necessary (step S2; No), the controller 31 shifts the process to step S6 described below.

If it is judged in step S2 that auxiliary color ink printing is necessary (step S2; Yes), the controller 31 detects the remaining amount of each color ink in the design head 41*b* (step S3).

Specifically, in this step, the controller 31 detects the remaining amount of each color ink of cyan (C), magenta (M), and yellow (Y) in the design head 41*b* based on the ejection history of the color ink. The storage 32 records the ejection history data of each color ink from the time when the print head 41 is attached in a new cartridge state, and the controller 31 detects the remaining amount of each color ink based on this ejection history data. The amount of ink ejected per shot is known. However, the method of detecting the remaining amount of ink is not limited to this.

Next, the controller 31 determines the ink with the highest number of printable times for auxiliary color ink printing among the multiple color inks of design head 41*b*, as the auxiliary color ink (step S4).

The number of printable times for auxiliary color ink printing is calculated (disregard numbers after the decimal point) by dividing the remaining amount of ink (remaining ejectable amount) detected in step S3 by the ejection amount required for auxiliary color ink printing in step S5 described below.

In the case where there is only one color ink that can be used as the auxiliary color ink (a color ink that can be distinguished from the base ink by image processing), the detection of remaining amount of ink in step S3 and the selection of ink based on the detected remaining amount of ink in step S4 may be omitted, and this color ink may be determined as the auxiliary color ink.

Here is an example of comparative judgment of the ink amount in step S4.

In the example, the remaining amount (remaining ejectable amount) of ink detected in step S3 is assumed as follows:

Cyan: 100
Magenta: 95
Yellow: 105

The ejection amount of each ink required for auxiliary color ink printing in the example is assumed as follows:

Cyan: 20
Magenta: 10
Yellow: 30

In this case, if only the remaining amount is compared, yellow becomes the auxiliary color ink because of "yellow>cyan>magenta".

However, if the number of printable times is compared by taking the density (ejection amount) required for auxiliary color ink printing into consideration, the number of printable times becomes "magenta (95/10≈9)>cyan (100/20=5)>yellow (105/30≈3)," and thus magenta becomes the auxiliary color ink.

In step S4, among the multiple color inks in the design head 41*b*, the ink with the largest amount obtained by subtracting the ejection amount (density) required for auxiliary color ink printing from the remaining amount may be determined as the auxiliary color ink.

In other words, in this case, the value obtained by subtracting the ejection amount required for auxiliary color ink printing in step S5 described below from the remaining amount detected in step S3 is compared.

In this case, when the comparative judgement example of the ink amount is shown by the above setting values of inks, the remaining amount after printing is "magenta (95−10=85) >cyan (100−20=80)>yellow (105−30=75)", and thus magenta becomes the auxiliary color ink.

Next, the controller 31 controls the operation of the design head 41*b* to perform auxiliary color ink printing on the adjustment sheet P using the auxiliary color ink determined in step S4 (step S5).

In this embodiment, a total of four pattern printing regions A are printed on the white recording sheet P shown in FIG. 5A, two pattern printing regions A being arranged in each of the X and Y directions, as shown in FIG. 5B.

The controller 31 then controls the operation of the base head 41*a* to print the alignment patterns M1 with the base ink on the pattern printing regions A in the recording sheet P (step S6).

In this embodiment, as shown in FIG. 5C, the controller 31 prints a cross-shaped alignment pattern M1 consisting of line segments along the X and Y directions on each pattern printing region A. The shape of the alignment pattern M1 is not limited to a cross shape, but can also be various polygons such as triangles and squares, circles, various letters, numbers, symbols, etc.

Next, the controller 31 photographs the printed alignment patterns M1 by the photographing unit 50 (step S7). Thereby, the controller 31 acquires the sheet image of the recording sheet P on which the alignment patterns M1 are printed.

Next, the controller 31 calculates and sets the alignment values based on the sheet image acquired in step S7 (step S8). The alignment value is the correction information regarding the deviation between the position of the alignment pattern M1 actually printed (this is called the "actual printing position") and the target printing position that should have been printed.

Specifically, in this step, the controller 31 first finds the center of the alignment pattern M1 (the intersection point of the two line segments). Then, the controller 31 calculates the difference between the actual printing position of the center of the alignment pattern M1 and the corresponding target printing position as the alignment value. For example, if the coordinates of the actual printing position at the center of the alignment pattern M1 are (Cx, Cy) and the coordinates of the corresponding target printing position are (Dx, Dy), the X-direction alignment value Ex is calculated by "Ex=Cx−

Dx" and the alignment value Ey in the Y direction is calculated by "Ey=Cy−Dy". The calculated alignment values are stored in the storage 32.

The alignment values calculated and set in this way are referred to as coordinate correction values in the subsequent generation of printing data. As a result, alignment adjustment is properly performed on the base head 41*a*, the deviation between the actual printing position of the base ink and the target printing position is resolved, and the printing data reflecting this is generated.

In the case where multiple alignment patterns M1 are printed and multiple center positions (center points) are taken, the actual printing distance between the center points can be obtained. By comparing the actual printing distance with the target printing distance between the corresponding center points, it is also possible to judge that the actual printing distance between the center points is longer or shorter than the target printing distance between the center points that should be printed. Based on this judgement, the deviation amount of the height position of photographing device 51 that acquired the sheet image (i.e., the distance to the printing target surface, that is, whether the photographing device 51 is installed at the upper or lower position in the device) can be obtained.

Furthermore, by acquiring the deviation amount of tilt between the straight line connecting the actual printed center points and the straight line connecting the corresponding center points, it is also possible to acquire the degree of rotation (installation angle) of the photographing device 51.

There is some error in the photographing device 51 (camera) of the photographing unit 50 installed in the printing device 1 during assembly. By printing multiple alignment patterns M1 and obtaining the center point of each alignment pattern M1, it is possible to obtain not only the misalignment of the print head 41, but also the installation error of the photographing device 51, and by making corrections based on this installation error, it is possible to perform printing processing more accurately.

Next, alignment adjustment processing of the design head 41*b* will be described.

Figure 6:
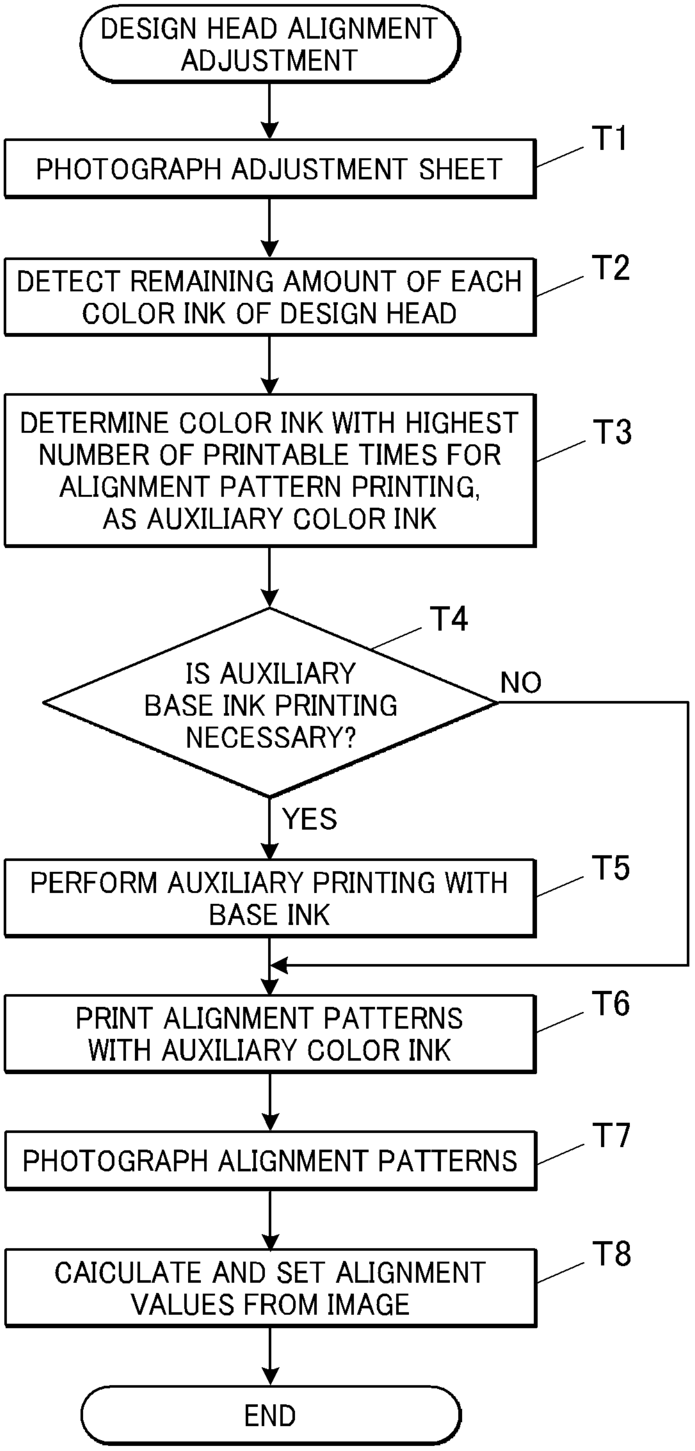
FIG. 6 is a flowchart showing the flow of alignment adjustment processing of a design head in the embodiment.
Figure 7A:
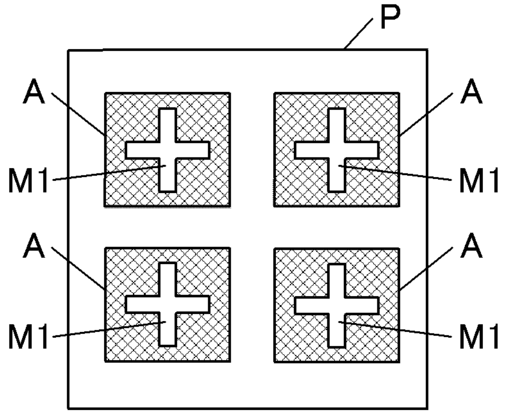
FIGS. 7A to 7C are views for explaining the alignment adjustment processing of the design head in the embodiment.
Figure 7B:
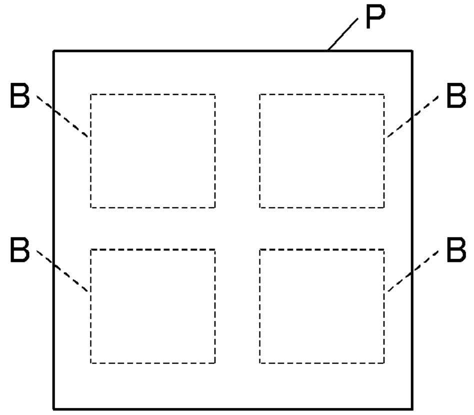
Figure 7C:
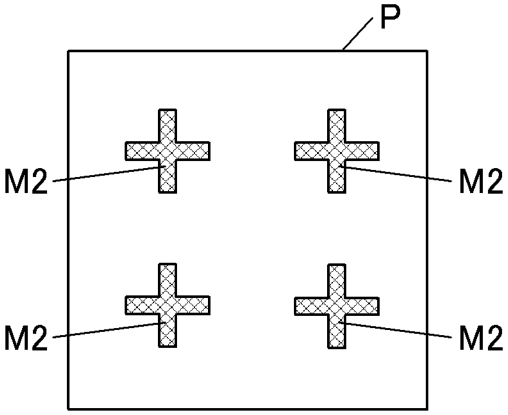

FIG. 6 is a flowchart showing the flow of the alignment adjustment processing of the design head 41*b*, and FIGS. 7A to 7C are diagrams to explain the alignment adjustment processing of the design head 41*b*.

Here, it is assumed that the alignment adjustment of the base head 41*a* has already been performed.

As shown in FIG. 6, when the alignment adjustment processing of the design head 41*b* is executed, the controller 31 first photographs the adjustment sheet P with the photographing unit 50 to acquire the sheet image (step T1).

Next, the controller 31 detects the remaining amount of each color ink in the design head 41*b* (step T2).

In this step, the controller 31 detects the remaining amount of each color ink of cyan (C), magenta (M), and yellow (Y) in the design head 41*b*, similarly to step S3 in the above-mentioned alignment adjustment processing of the base head 41*a*.

Next, the controller 31 determines the ink with the highest number of printable times for alignment pattern printing among the multiple color inks of design head 41*b*, as the auxiliary color ink (step T3).

In this step, the controller 31 determines the auxiliary color ink, similarly to step S4 in the above-mentioned alignment adjustment processing of the base head 41*a*, except that the "auxiliary color ink" in this case is used for printing alignment patterns M2 (see FIG. 7C), different from the alignment adjustment processing of the base had 41*a*.

That is, in this step, the value (disregard numbers after the decimal point) obtained by dividing the remaining amount of ink (remaining ejectable amount) detected in step T2 by the ejection amount required for alignment pattern printing in step T6 described below is compared as the number of printable times.

In step T3, among the multiple color inks in the design head 41*b*, the ink with the largest amount obtained by subtracting the ejection amount (density) required for alignment pattern printing from the remaining amount may be determined as the auxiliary color ink.

In other words, in this case, the value obtained by subtracting the ejection amount required for alignment pattern printing in step T6 described below from the remaining amount detected in step T2 is compared.

Next, the controller 31 judges whether or not auxiliary base ink printing is necessary based on the sheet image acquired in step T1 (step T4). In the embodiment, "auxiliary base ink printing" means auxiliary printing in which the base ink of base head 41*a* is printed in the printing range so that the alignment patterns M2 for alignment adjustment can be recognized as an image before printing the alignment patterns M2 with the color ink. The auxiliary color ink used for auxiliary printing is the ink that allows the alignment patterns M2 of the color ink to be identified by image processing. However, the auxiliary color ink is not limited to this as long as the ink is a different color from the color ink.

In this step, the controller 31 judges whether the auxiliary base ink printing is necessary, similarly to step S2 in the alignment adjustment processing of base head 41*a* described above. That is, the controller 31 checks, as the state of the adjustment sheet P, whether or not the pattern printing regions B of the required range exist on the adjustment sheet P. The pattern printing region B is the region of color which allows the auxiliary color ink to be identified and in which the alignment pattern M2 is to be printed. The required range is the range in which multiple alignment patterns M2 of a predetermined quantity and position used for alignment adjustment can be printed. In the alignment adjustment of this embodiment, there are used a total of four pattern printing regions B and four alignment patterns M2, two of the pattern printing regions B and two of the alignment patterns M2 being arranged in each of the X and Y directions (see FIGS. 7B and 7C). However, the quantity and position of the alignment patterns M2 are not limited to this.

When the controller 31 detects the pattern printing regions B in the required range, the controller 31 judges that the auxiliary base ink printing is not necessary. When the pattern printing regions B in the required range cannot be detected, the controller 31 judges that the auxiliary base ink printing is necessary.

If the controller 31 judges that the auxiliary base ink printing is not necessary (step T4; No), the controller 31 shifts the process to step T6 described below.

In step T4, if it is judged that auxiliary base ink printing is necessary (step T4; Yes), the controller 31 performs auxiliary base ink printing on the adjustment sheet P with the base ink (step T5).

For example, as shown in FIG. 7A, when the pattern printing regions A and the alignment patterns M1 printed at the previous alignment adjustment of the base head 41*a* are printed on the recording sheet P, the controller 31 prints pattern printing regions B with the base ink to fill in the pattern printing regions A and alignment patterns M1, as shown in FIG. 7B.

The controller 31 then controls the operation of the design head 41*b* to print the alignment patterns M2 with the auxiliary color ink determined in step T3 on the pattern printing regions B in the recording sheet P (step T6).

In this embodiment, as shown in FIG. 7C, the controller 31 prints a cross-shaped alignment pattern M2 consisting of line segments along the X and Y directions on each pattern printing region B. The shape of the alignment pattern M2 is not limited to a cross shape, but can also be various polygons such as triangles and squares, circles, various letters, numbers, symbols, etc.

Next, the controller 31 photographs the printed alignment patterns M2 (step T7), and calculates and sets the alignment values on the basis of the acquired sheet image (step T8).

In these steps, the controller 31 photographs the alignment patterns M2 and calculates the alignment values, similarly to steps S7 and S8 in the alignment adjustment processing of the base head 41*a* described above.

The alignment values calculated and set in this way are referred to as coordinate correction values in the subsequent generation of printing data. As a result, alignment adjustment is properly performed on the design head 41*b*, the deviation between the actual printing position of each color ink and the target printing position is resolved, and printing data reflecting this is generated.

Also, when the alignment adjustment is performed for both two heads of the print head 41 (base head 41*a* and design head 41*b*) such as when both of the two heads are replaced, the alignment adjustment is first performed for the design head 41*b* without auxiliary printing on the white recording sheet P. Then, the alignment adjustment may be performed for the base head 41*a* using, as the head for auxiliary printing, the design head 41*b* for which alignment adjustment has been already performed.

As described above, according to the embodiment, when one of the base head 41*a* and the design head 41*b* is used as a head for alignment pattern printing and the other is used as a head for auxiliary printing and alignment adjustment is performed on the one of the base head 41*a* and the design head 41*b*, from the design head 41*b*, the ink with the highest number pf printable times of alignment pattern printing or auxiliary printing among the multiple color inks is ejected.

This allows the amounts of multiple color inks consumed in the design head 41*b* to be more evenly distributed. Accordingly, the service life of the print head 41 (design head 41*b*) can be extended, and thus the ink cost can be reduced.

In addition, by performing comparative judgement of the amount of ink, including not only the remaining amount information but also the density (ejection amount) required for alignment pattern printing or auxiliary printing, the amount of each ink consumed can be evenly distributed with greater accuracy. As a result, the service life of the print head 41 can be further extended and the ink cost can be reduced.

Also, according to the embodiment, by printing the pattern printing regions as auxiliary printing using the ink of a different color from the alignment patterns, and then printing the alignment patterns on the pattern printing regions, a single recording sheet P is sufficient for alignment adjustment of any print head 41. Therefore, there is no need to replace the recording sheet P according to the print head 41 on which alignment adjustment is to be performed.

Though the embodiment of the present disclosure has been described above, the present disclosure is not limited to the embodiment, and various modifications can be made within the scope of the present disclosure.

In the embodiment, the base head 41*a* ejects the white base ink, and the design head 41*b* ejects multiple color inks. However, the ink colors are not limited to any particular color as long as the base ink ejected by the base head 41*a* and the multiple inks ejected by the design head 41*b* are different from each other.

The embodiment takes, as an example, a case where the printing device 1 cooperates with the terminal device 7 to form a printing system, in which only the printing device 1 performs the operation control for the alignment adjustment of print head 41 and executes the alignment adjustment. However, even for the alignment adjustment of the print head 41, the printing device 1 and the terminal device 7 may operate in cooperation with each other. For example, the controller 81 of the terminal device 7 may integrally control the entire system.

Various data such as nail designs, photographed images, and nail shape information may be stored in a storage of a terminal device or in a storage of the printing device 1.

Alternatively, the various data may be stored in a server device or the like that can be connected via a network line or the like, and the terminal device or the printing device 1 may be configured to access the server device or the like to refer to this data. In this way, it is possible to select a design to be printed from a larger number of nail designs.

Although several embodiments of the present disclosure have been described, the scope of the present disclosure is not limited to the above described embodiments and includes the scope of the present disclosure that is described in the claims and the equivalents thereof.

What is claimed is:

1. A printing device comprising:

a first print head that ejects a first ink for printing a base;

a second print head that ejects multiple second inks for printing a design;

a processor that:

upon performing alignment adjustment of the first print head, controls the first print head so that a first alignment pattern is printed by the first ink, and controls the second print head so that a first background image to be a background of the first alignment pattern is printed by an ink for which a number of printable times of auxillary printing is highest among the multiple second of inks ahead of printing of the first alignment pattern.

2. The printing device according to claim 1, wherein the processor causes the second print head to print a pattern printing region and causes the first print head to print the first alignment pattern on the pattern printing region.

3. The printing device according to claim 1, further comprising a memory that stores ejection history information of the second inks, wherein the processor detects a remaining amount of each of the second inks based on the ejection history information and derives the number of printable times based on the remaining amount of each of the second inks.

4. The printing device according to claim 1, further comprising a photographing device that photographs a printing target surface of the first print head, and the second print head, wherein the processor judges whether or not the auxiliary printing is necessary based on an image acquired by the photographing device.

5. The printing device according to claim 1, wherein the first ink is a white base ink, and each of the second inks is a color ink.

6. The printing device according to claim 1, wherein upon performing alignment adjustment of the second print head, the processor controls the second print head so that a second alignment pattern is printed by a second ink among the multiple second inks.

7. An alignment adjustment method that is executed by a printing device including a first print head that ejects a first ink for printing a base, and a second print head that ejects multiple second inks for printing a design, wherein the first ink, and the second inks have different colors from each other, the method comprising:

upon performing alignment adjustment of the first print head, controlling the first print head so that a first alignment pattern is printed by the first ink, and controlling the second print head so that a first background image to be a background of the first alignment pattern is printed by an ink for which a number of printable times of auxiliary printing is highest among the multiple second inks ahead of printing of the first alignment pattern.

8. The alignment adjustment method according to claim 7, further comprising causing, by the processor, the second print head to print a pattern printing region and causing, by the processor, the first print head to print the first alignment pattern on the pattern printing region.

9. The alignment adjustment method according to claim 7, further comprising detecting, by the processor, a remaining amount of each of the second inks based on ejection history information and deriving the number of printable times based on the remaining amount of each of the second inks, wherein the printing device further includes a memory that stores the ejection history information of the second inks.

10. The alignment adjustment method according to claim 7, further comprising judging, by the processor, whether or not the auxiliary printing is necessary based on an image acquired by a photographing device, wherein the printing device further includes the photographing device, and the photographing device photographs a printing target surface of the first print head, and the second print head.

11. The printing control alignment adjustment method according to claim 7, wherein the first ink is a white base ink, and each of the second inks is a color ink.

12. The alignment adjustment method of claim 7, wherein upon performing adjustment of the second print head, controlling the second print head so that a second alignment pattern is printed by a second ink among the multiple second inks.

13. A non-transitory computer readable storage medium storing an alignment adjustment program that is executed by a printing device including a first print head that ejects a first ink for printing a base, and a second print head that ejects multiple second inks for printing a design, wherein the first ink, and the second ink have different colors from each other, the alignment adjustment program causing a computer to:

upon performing alignment adjustment of the first print head, control the first print head so that a first alignment pattern is printed by the first ink, and control the second print head so that a first background image to be a background of the first alignment pattern is printed by an ink for which a number of printable times of auxiliary printing is highest among the multiple second inks ahead of printing of the first alignment pattern.

* * * * *